(12) United States Patent
Stauder et al.

(10) Patent No.: US 9,759,344 B2
(45) Date of Patent: Sep. 12, 2017

(54) FLUSH VALVE SEAT

(75) Inventors: Frank A. Stauder, London (CA); Xan Vy Du, London (CA); Robert Kropiniewicz, London (CA)

(73) Assignee: MASCO CANADA LIMITED (CA)

( * ) Notice: Subject to any disclaimer, the term of this patent is extended or adjusted under 35 U.S.C. 154(b) by 1518 days.

(21) Appl. No.: 13/039,759

(22) Filed: Mar. 3, 2011

(65) Prior Publication Data

US 2011/0226978 A1 Sep. 22, 2011

Related U.S. Application Data

(60) Provisional application No. 61/314,752, filed on Mar. 17, 2010.

(51) Int. Cl.
*F16K 27/02* (2006.01)
*E03D 3/04* (2006.01)
*F16K 21/06* (2006.01)

(52) U.S. Cl.
CPC .............. *F16K 27/02* (2013.01); *E03D 3/04* (2013.01); *F16K 21/06* (2013.01)

(58) Field of Classification Search
CPC .............................. F16K 31/3835; E03D 3/04
USPC ................................................ 251/33, 38–40
See application file for complete search history.

(56) References Cited

U.S. PATENT DOCUMENTS

| 2,023,788 | A | * | 12/1935 | Miller | 251/34 |
| 2,369,104 | A | * | 2/1945 | Fredrickson | E03D 3/04 |
|  |  |  |  |  | 137/630 |
| 3,279,742 | A | * | 10/1966 | Billeter | 251/40 |
| 4,261,545 | A | * | 4/1981 | Allen | E03D 3/04 |
|  |  |  |  |  | 138/40 |
| 4,272,052 | A | * | 6/1981 | Gidner | 251/39 |
| 4,586,692 | A | * | 5/1986 | Stephens | 251/15 |
| 2,246,374 | A |  | 1/1992 | Yeo |  |
| 5,970,527 | A | * | 10/1999 | Martin et al. | 4/361 |
| 6,041,809 | A | * | 3/2000 | Johnson | E03D 3/08 |
|  |  |  |  |  | 137/247.25 |

FOREIGN PATENT DOCUMENTS

FR 2529636 1/1984

* cited by examiner

*Primary Examiner* — Jessica Cahill
*Assistant Examiner* — Daphne M Barry
(74) *Attorney, Agent, or Firm* — Carlson, Gaskey & Olds, P.C.

(57) ABSTRACT

A flush valve has a valve body having an inlet and an outlet, and a piston disposed in the valve body between the inlet and the outlet. A surface is disposed in the valve body for seating the piston. The surface tapers inwardly as it passes into the outlet wherein the taper improves the flow characteristics of fluid passing by the taper thereby minimizing water hammer and leakage therethrough.

11 Claims, 4 Drawing Sheets

FLUSH VALVE SEAT

RELATED APPLICATION

This application claims priority to U.S. Provisional Application No. 61/314,752, which was filed on Mar. 17, 2010.

BACKGROUND OF THE INVENTION

Flush valves may have a handle that, when manipulated, pushes an actuator which, in turn, opens a bypass valve within a piston in the flush valve. By opening the bypass valve, pressure above the piston drops and allows line pressure to lift the piston from its seat within the flush valve and channel water to flush a toilet, urinal or the like. While the toilet or urinal fixture is being flushed, line pressure is also directed above the piston increasing the pressure in this area. As the pressure equalizes the piston seats itself within the flush valve and stops flow therethrough.

Commercial flush valves sometimes experience problems such as water hammer and failure to shut off. Water hammer may occur if water in motion is forced to stop or change direction suddenly. This rapid change in momentum creates a surge in pressure and results in shock waves that propagate through the piping making noise. Some plumbing codes require flush valves to have anti-backflow devices like a vacuum breaker to prevent fouling of the potable water supply in the event of backflow from the toilet or urinal fixture into the valve and the related water supply.

SUMMARY OF THE INVENTION

A flush valve has a valve body having an inlet and an outlet, and a piston disposed in the valve body between the inlet and the outlet. A surface is disposed in the valve body for seating the piston. The surface tapers inwardly as it passes into the outlet wherein the taper improves the flow characteristics of fluid passing by the taper thereby minimizing water hammer and leakage therethrough.

DESCRIPTION OF THE PREFERRED EMBODIMENT

Figure 1:
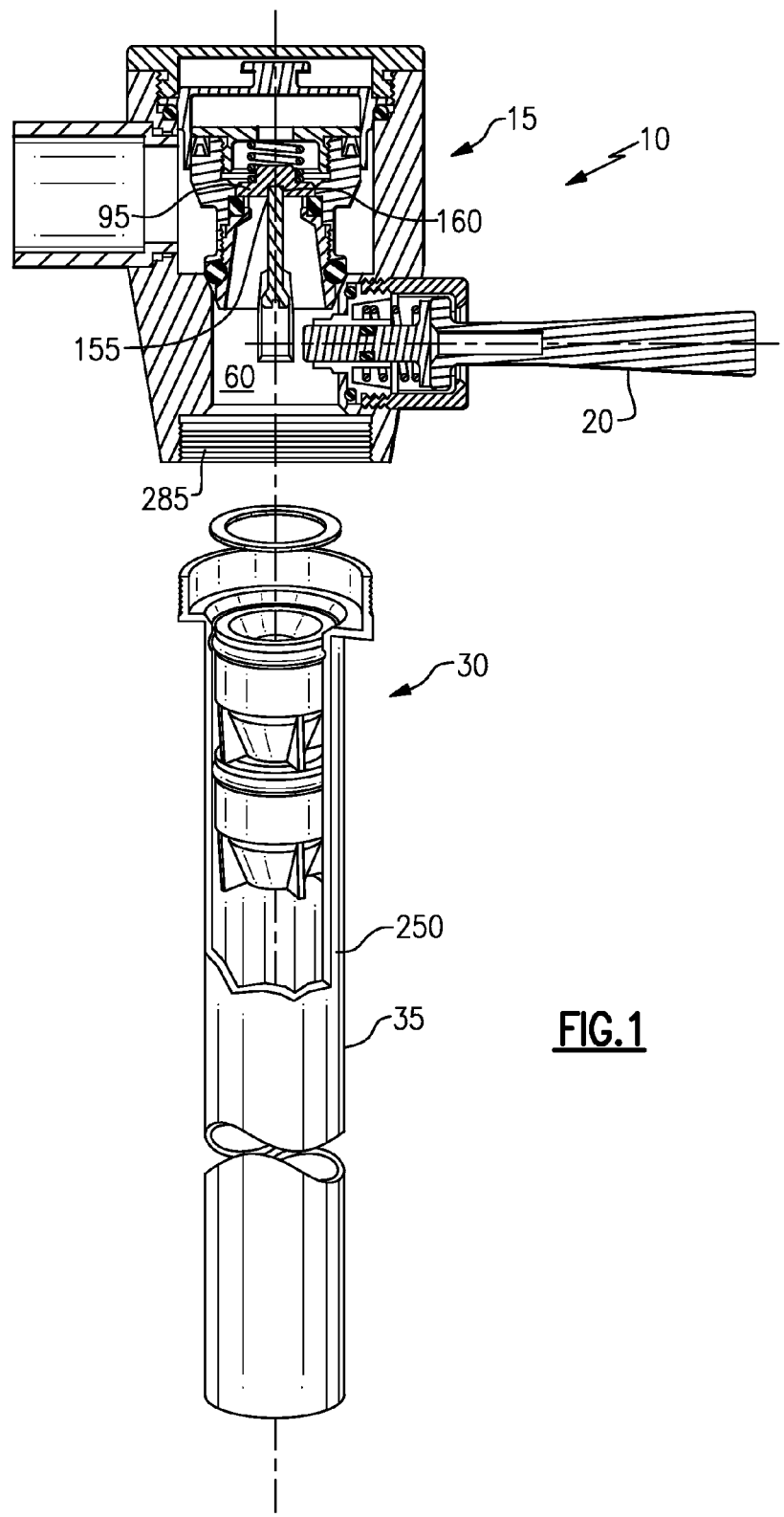
FIG. 1 is a perspective cutaway view of the flush valve of the invention.

Referring to FIG. 1, the flush valve 10 of the invention is shown. The flush valve 10 has a valve assembly 15, an actuator assembly 20 (as in known in the art), an anti-back flow cartridge 30 and a discharge tube 35 that disgorges water into a toilet or urinal (not shown) or the like.

Figure 2:
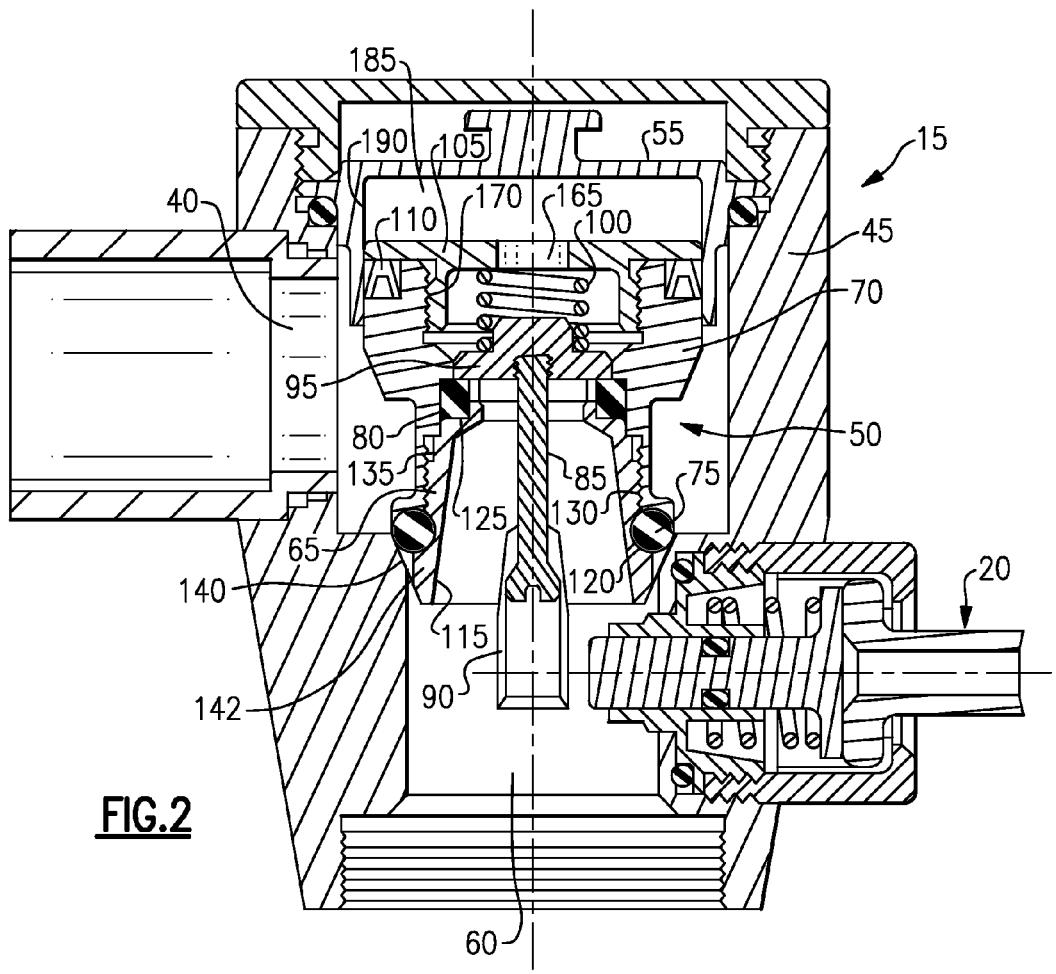
FIG. 2 is a perspective view of the valve of FIG. 1.
Figure 3:
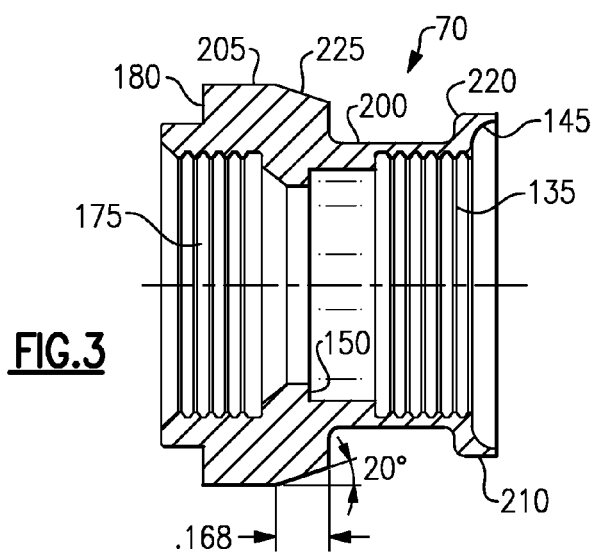
FIG. 3 is a side view of the piston body of FIG. 2.

Referring now to FIGS. 2 and 3, the valve assembly 15 has an inlet 40 disposed in a valve body 45, a piston 50 operating in the valve body 45, a piston cap 55 and an outlet 60 disposed in the valve body. The piston 50 comprises a piston guide 65, a piston body 70, an o-ring 75, a bypass seal 80, an actuator 85, a collar 90, a bypass valve 95, a spring 100, a cap 105, and a wiper seal 110.

The piston guide 65 has a tapered interior 115, a circular cutout 120 for holding the o-ring 75, a shoulder 125 for mounting the bypass seal 80 and threads 130 for mating with the threaded piston body interior 135. An extended portion 142 of the piston guide 65 extends beyond a tapered portion 140 of the valve body 45 if the piston 50 is seated. The piston body 70 extends along central longitudinal axis A of the valve assembly 15. The tapered portion 140 of the valve body 45 tapers inward along an axial length L1 of the axis A, and the tapered interior 115 tapers radially outwardly along an axial length L2 of the axis A. As shown in FIG. 2, L2 is greater than L1. Also, when the valve assembly 15 is in the closed position (as shown in FIG. 2), the axial lengths L1 and L2 overlap, and the entirety of length L1 overlaps with length L2.

The piston body 70 has a lower cutout 145 for holding the o-ring 75 and an interior ledge 150 for holding the bypass seal 80. The shoulder 125 of the piston guide 65 and the interior ledge 150 of the piston body 70 position the bypass seal therebetween 80. Similarly, the circular cutout 120 of the piston guide 65 and the lower cutout 145 of the piston body trap the o-ring 75 therebetween.

The o-ring 75 seats the piston 50 on the tapered portion 140 of the valve body 45. In this embodiment, the tapered portion of the seal has a length of 0.125 inches and is disposed at an angle of 20° relative to the outlet, though other angles and lengths are possible for other valves.

The bypass valve 95, which seats on the bypass seal 80, has a threaded interior 155 for receiving the threaded portion 160 of the actuator 85. The actuator is attached to the collar 90 that interacts with the actuator assembly 20 (see also FIG. 1) to move/tilt the bypass valve 95 off of the bypass seal 80 as will be discussed herein.

The cap 105, which is circular, has a central opening 165 therein, and a set of downwardly extending threads 170 that attach to the interior threads 175 in the piston body 70. The cap 105 seats the spring 100 between it and the bypass valve 95. The cap also fixes the wiper seal 110 between it and an outer ledge 180 in the piston body.

The piston 50 moves upwardly and downwardly within the valve body 45 and within the piston cap 55, which is conventionally fixed for easy access within the valve body 45. An area 185 for holding fluid is defined in the piston cap 55 above the piston 50. The wiper seal 110 extends beyond the edges of the valve to form an interference fit with an interior wall 190 of the guide (see also FIG. 4) as will be discussed herein.

Referring to FIG. 3, the piston body 70 is shown. The piston body has a neck 200, a body portion 205 having a larger perimeter than the neck, and a shoulder 210 having a rounded portion 220 and a larger perimeter than the neck. The body portion has a taper 225 therein that slopes inwardly towards the neck 200. In the embodiment shown herein, the taper is disposed at an angle of approximately 20° relative to the shoulder and has a length of approximately 0.168 inches. The rounded portion 220 of the shoulder 210 has a radius of approximately 0.04 inches. Other combinations and permutations of radius, angle and length may be used in other valves if they provide the benefits of this invention.

Figure 4:
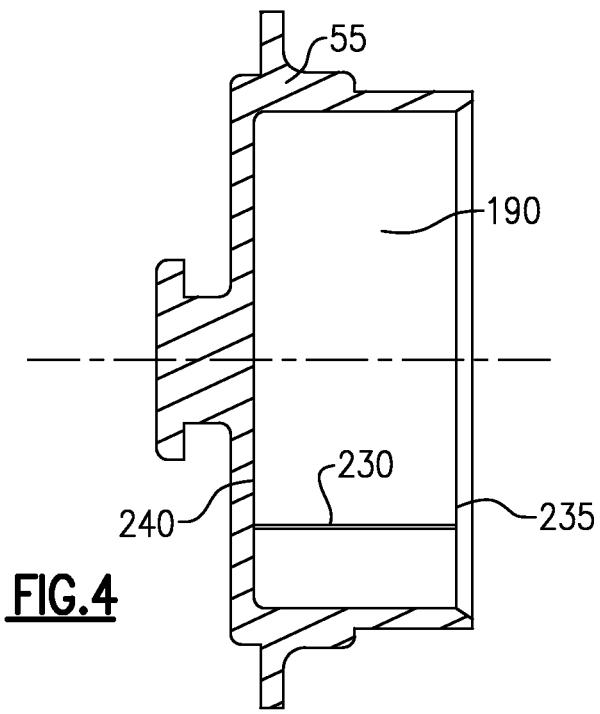
FIG. 4 is a perspective view of the piston cap of FIG. 2.
Figure 4A:
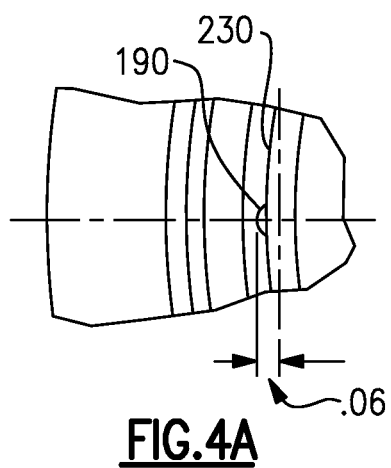
FIG. 4a is a top view of the piston cap of FIG. 4.

Referring to FIGS. 4 and 4a, the piston cap 55 is shown having, in the embodiment shown, a groove 230 having a depth of approximately 0.006 inches and a Ø of about 0.040 inches disposed in the inner wall 190. The groove extends from a bottom 235 of the valve guide 55 to a top 240 thereof to communicate fluid from the valve inlet 40 to the area above the valve 185. The shape of the groove 230 minimizes a possibility that debris (not shown) might get stuck in or clog the groove. The groove is further sized to allow fluid to equalize above the piston 50 to seat the piston as will be discussed herein while allowing enough fluid to pass by the wiper seal 110 to achieve an adequate flushing function. If the groove is too small in area, the valve will be open too long and if too large in area, too short.

Before the valve 15 is operated, pressure is equalized between the area 185 within the piston cap 55 above the piston 50 and line pressure in the plumbing system (not shown) within the inlet 40. Pressure in the outlet 60 is low as fluid has been disgorged therethrough. During operation of the piston 50, if the actuator assembly 20 is manipulated, the collar 90 is tilted and the actuator 85 attached thereto tips the bypass valve 95 off the bypass seal 80 against the force of the spring 100 to allow fluid to flow from the area 185 above the piston thereby lowering the pressure therein. Line pressure in the inlet 40 therefore pushes the valve 50 off its seat 140 within the valve body 45 to allow fluid to flow past the neck 200 of the piston body 70, the o-ring 75, the extended portion 142 of the piston guide 65, the rounded portion 220 of the piston body shoulder 210, and the piston body taper 225 that slopes inwardly towards the neck 200, to exit the valve.

As the valve 50 operates, inlet fluid flows through the groove 230, bypassing the wiper seal 110, gradually allowing pressure in the area 185 above the piston 50 to equalize with the line pressure thereby gradually moving the piston 50 down along the inner wall 190 of the piston cap 55 until o-ring 75 seals against the tapered portion 140 of the valve body 45. As the valve moves, the wiper seal 110 tends to remove debris that might clog or block fluid from flowing in the groove in the piston cap 55.

The extended portion 142 of the piston guide 65, in conjunction with the o-ring 75 and the tapered portion 140 of the valve body 45, helps to create a funnel to minimize turbulent flow from the valve 50 as the valve seats on the tapered portion 140 of the housing 45 thereby minimizing water hammer. Similarly, the tapered portion 225 and the rounded portion 220 of the piston body 70, collectively and individually, smooth flow around the piston body also minimizing the effects of water hammer in the valve. Additionally, the neck portion 200 of the piston body 70 allows inlet pressure to be more equally distributed therearound thereby centering the valve more efficiently thereby easing translation of the valve in the piston cap 55 and extending valve life.

Figure 5:
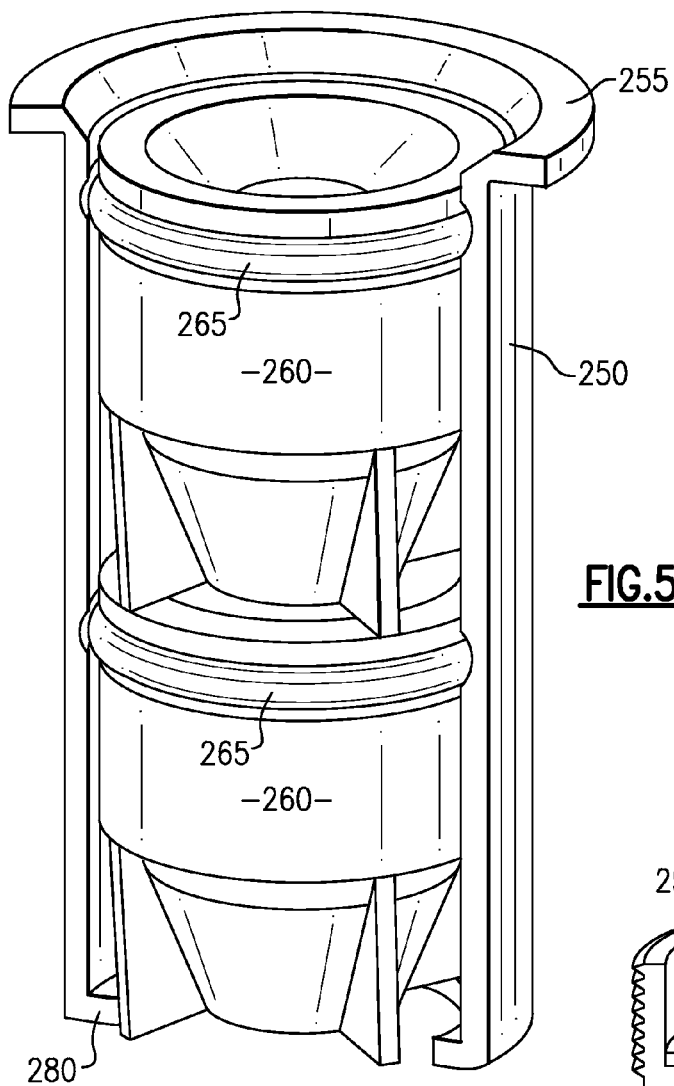
FIG. 5 is a perspective view of the anti-backflow prevention device of FIG. 1.
Figure 5A:
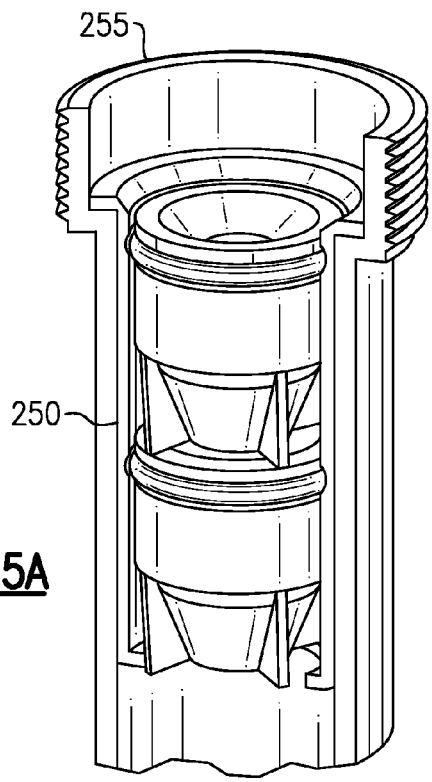

Referring now to FIGS. 1, 5, and 5*a*, the anti-backflow cartridge 30 is shown. The cartridge has a tubular housing 250 that slips into the discharge tube 35. The tubular housing has a lip 255 that prevents the housing from slipping down into the discharge tube thereby giving a user easy access to the cartridge if maintenance is required. A pair of anti-backflow check valves 260, manufactured by Neoperl, are arranged in series in the tubular housing and each are held therein the tubular housing 250. The anti-backflow valves provide enough resistance to minimize backflow while allowing enough flow to maximize the use of the toilet or urinal. The o-rings 265 also prevent fluid from flowing around each anti-backflow check valve back to the valve assembly 10. A flange 280 may extend inwardly at a bottom of said tubular housing 250.

In an alternative embodiment shown in FIG. 1, the cartridge 250 is the discharge tube and if the cartridge needs replacement, the discharge tube is replaced therewith. The discharge tube 35 has a set of threads 255 therearound for mating with the threads 285 of the valve body 45.

Each anti-backflow valve 260 prevents fluid from flowing up from the toilet or urinal (not shown) so that neither the water supply nor the valve assembly 15 is contaminated by the fluid. The anti-backflow valves replace vacuum breakers (not shown) and also have a much longer life than a typical prior art vacuum breaker.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. For instance, one of ordinary skill in the art will recognize that other designs such as objects, abstracts, architectural features may be substituted for the designs shown herein. It is therefore to be understood that within the scope of the appended claims, the invention may be practiced other than as specifically described. For that reason the appended claims should be studied to determine true scope and content.

What is claimed:

1. A flush valve, said flush valve comprising:
a valve body having an inlet and an outlet;
a piston disposed in said valve body between said inlet and said outlet, the piston comprising a piston body and a piston guide that extends out of the piston body towards the outlet;
a seating surface disposed in said valve body for seating said piston, said seating surface tapering inward along a first axial length of the flush valve as it passes into said outlet; and
an o-ring seal disposed upon said piston and trapped between a cutout of the piston guide and a cutout of the piston body, the o-ring seal seating the piston on the seating surface when the flush valve is in a closed position;
the piston guide having an interior that tapers radially outward towards the outlet along a second axial length of the flush valve, the first and second axial lengths overlapping when the flush valve is in a closed position.

2. The flush valve of claim 1, wherein said seating surface tapers inwardly at an angle of 20°.

3. The flush valve of claim 1, wherein said seating surface extends 0.125 inches along said outlet.

4. The flush valve of claim 1, wherein said o-ring seal is positioned on a side of said valve body that is adjacent to said outlet.

5. The flush valve of claim 1, wherein a portion of the piston guide that extends out of the piston body extends beyond said seating surface of said valve body.

6. The flush valve of claim 1, wherein said piston body has a cap that is threadably attached to said piston body.

7. The flush valve of claim 6, comprising a piston cap outwardly of said cap, and a fluid holding area between said cap and said piston cap.

8. The flush valve of claim 7, wherein said piston cap includes a groove that communicates a fluid from said inlet to said fluid holding area.

9. The flush valve of claim 1, wherein the piston body has a neck, a body portion on a first side of said neck, and a shoulder on a second side of said neck, said body portion and said shoulder having a larger perimeter than said neck.

10. The flush valve of claim 1, wherein the second axial length is greater than the first axial length.

11. The flush valve of claim 1, wherein an entirety of the first axial length overlaps with the second axial length when the flush valve is in the closed position.

\* \* \* \* \*